(12) United States Patent
Sakaue

(10) Patent No.: US 11,381,333 B2
(45) Date of Patent: Jul. 5, 2022

(54) COMMUNICATION APPARATUS, COMMUNICATION SYSTEM, COMMUNICATION METHOD, AND COMPUTER READABLE MEDIUM

(71) Applicant: MITSUBISHI ELECTRIC CORPORATION, Tokyo (JP)

(72) Inventor: Taichi Sakaue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/159,703

(22) Filed: Jan. 27, 2021

(65) Prior Publication Data

US 2021/0152266 A1 May 20, 2021

Related U.S. Application Data

(63) Continuation of application No. PCT/JP2018/035174, filed on Sep. 21, 2018.

(51) Int. Cl.
*H04J 3/06* (2006.01)

(52) U.S. Cl.
CPC .......... *H04J 3/0644* (2013.01); *H04J 3/0641* (2013.01); *H04J 3/0647* (2013.01)

(58) Field of Classification Search
USPC ........................................................ 370/503
See application file for complete search history.

(56) References Cited

U.S. PATENT DOCUMENTS 11,082,141 B2 * 8/2021 Itagaki ............... H04W 56/0015
11,290,250 B2 * 3/2022 Sarda ........................ H03L 7/18
(Continued)

FOREIGN PATENT DOCUMENTS

CN     105634636 A    6/2016
JP       6-21955 A    1/1994
(Continued)

OTHER PUBLICATIONS

"IEEE Standard for a Precision Clock Synchronization Protocol for Networked Measurement and Control Systems", IEEE Std 1588TM-2008, total 289 pages.
(Continued)

*Primary Examiner* — Gregory B Sefcheck
*Assistant Examiner* — Majid Esmaeilian
(74) *Attorney, Agent, or Firm* — Birch, Stewart, Kolasch & Birch, LLP

(57) ABSTRACT

A priority verification unit (110) obtains from, among a plurality of communication apparatuses, other communication apparatus other than a current grandmaster, a grandmaster mediation message that is a grandmaster mediation message used for selecting a grandmaster and that includes a priority of the other communication apparatus. The priority verification unit (110) verifies whether or not the priority of the other communication apparatus is higher than a grandmaster priority (22). A mediation unit (120), when the priority of the other communication apparatus is verified as being higher than the grandmaster priority (22), to obtain a synchronization message including time of the other communication apparatus from the other communication apparatus before switching the other communication apparatus to the grandmaster. The mediation unit (120) calculates difference between the time of the other communication apparatus and time of the communication apparatus, and when the difference is less than a threshold (23), switches the other communication apparatus to the grandmaster.

7 Claims, 8 Drawing Sheets

(56) References Cited

U.S. PATENT DOCUMENTS

| | | | |
|---|---|---|---|
| 2010/0098202 A1 | 4/2010 | Lai et al. | |
| 2010/0198363 A1 | 8/2010 | Yajima et al. | |
| 2013/0077509 A1* | 3/2013 | Hirota | H04L 43/106 370/252 |
| 2014/0028875 A1* | 1/2014 | Hara | H04N 5/77 348/231.5 |
| 2014/0098706 A1 | 4/2014 | Maruyama et al. | |
| 2016/0013876 A1* | 1/2016 | Zhang | H04J 3/0667 370/350 |
| 2016/0149692 A1 | 5/2016 | Kim et al. | |
| 2017/0078038 A1 | 3/2017 | Tashiro et al. | |
| 2018/0062780 A1 | 3/2018 | Shimizu et al. | |

FOREIGN PATENT DOCUMENTS

| | | |
|---|---|---|
| JP | 2006-310964 A | 11/2006 |
| JP | 2010-182103 A | 8/2010 |
| JP | 2012-114815 A | 6/2012 |
| JP | 2013-85278 A | 5/2013 |
| JP | 2013-108895 A | 6/2013 |
| JP | 2014-78781 A | 5/2014 |
| JP | 2015-12400 A | 1/2015 |
| JP | 2015-177275 A | 10/2015 |
| JP | 2015-179999 A | 10/2015 |
| JP | 2018-37885 A | 3/2018 |

OTHER PUBLICATIONS

"Timing and Synchronization for Time-Sensitive Applications in Bridged Local Area Networks", IEEE Std 802.1ASTM-2011, total 292 pages.

International Search Report for PCT/JP2018/035172 dated Dec. 4, 2018.

International Search Report for PCT/JP2018/035173 dated Dec. 4, 2018.

International Search Report for PCT/JP2018/035174 dated Dec. 4, 2018.

* cited by examiner

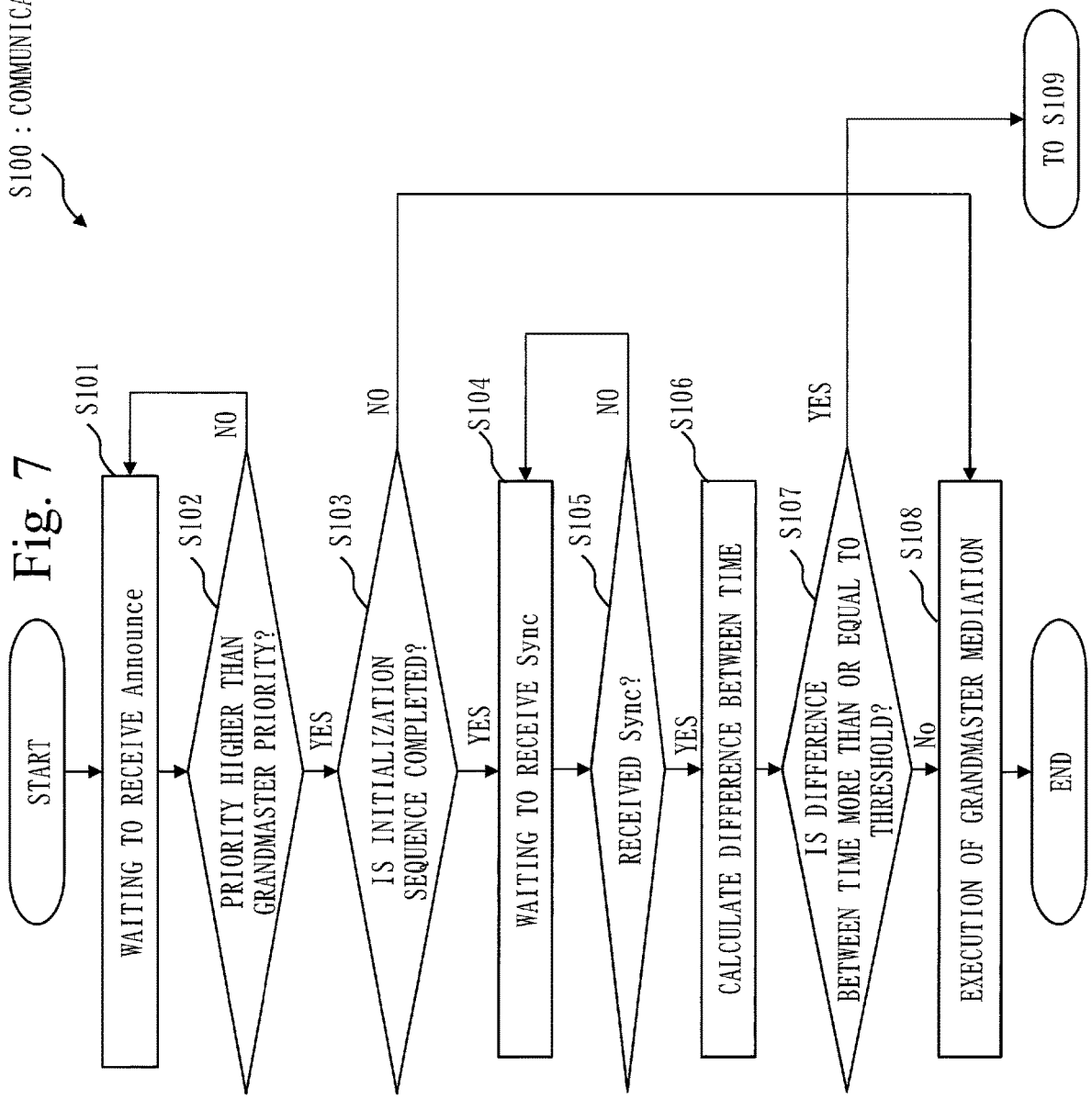

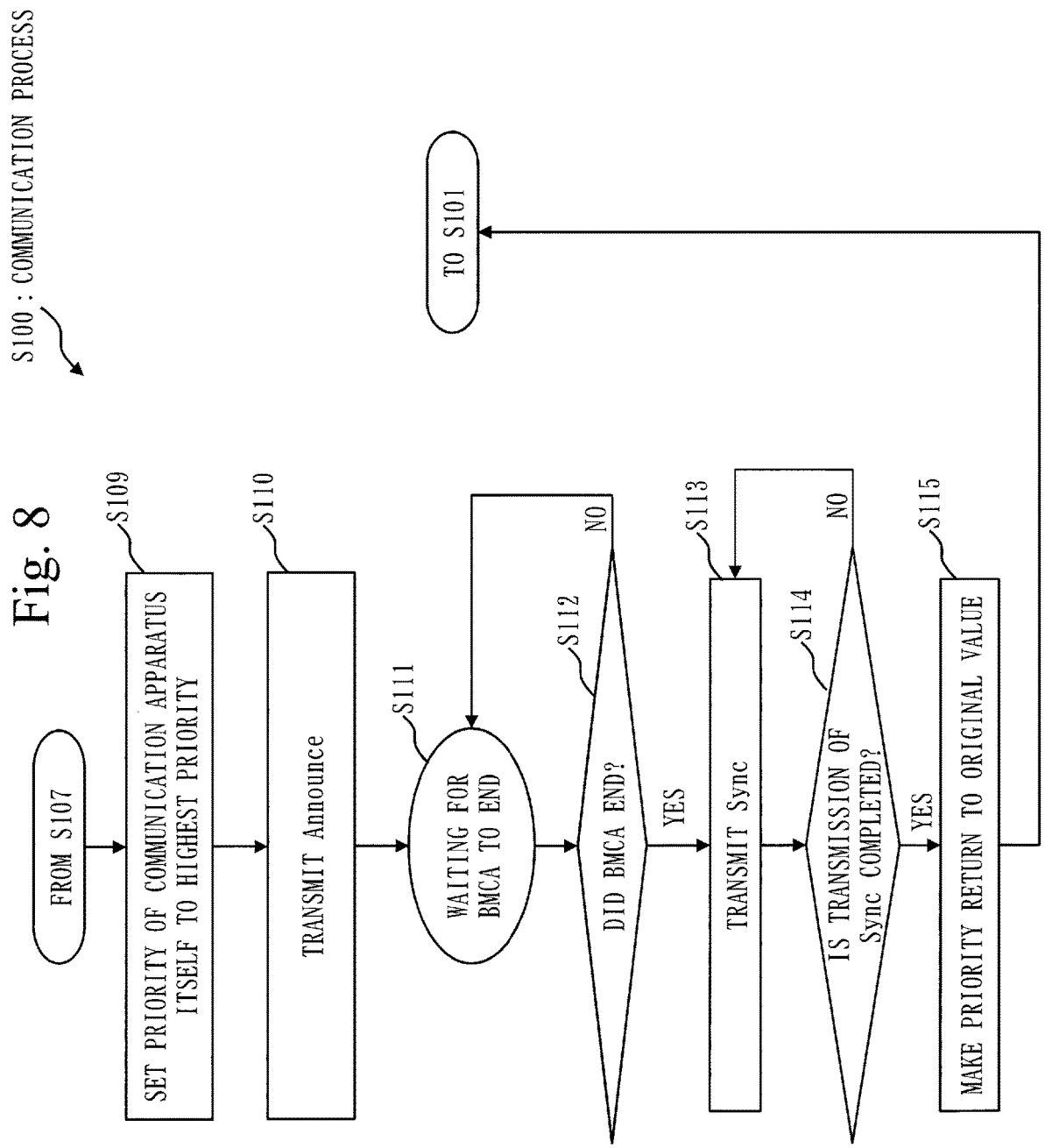

COMMUNICATION APPARATUS, COMMUNICATION SYSTEM, COMMUNICATION METHOD, AND COMPUTER READABLE MEDIUM

CROSS REFERENCE TO RELATED APPLICATIONS

This application is a Continuation of PCT International Application No. PCT/JP2018/035174, filed on Sep. 21, 2018, all of which is hereby expressly incorporated by reference into the present application.

TECHNICAL FIELD

The present invention relates to a communication apparatus, a communication system, a communication method, and a communication program. The present invention relates especially to a communication apparatus, a communication system, a communication method, and a communication program that perform time synchronization on a master-slave system.

BACKGROUND ART

There are standards regarding time synchronization technology such as IEEE1588 or IEEE802.1AS that synchronizes distributed clocks in a network on a master-slave system that is configured of a plurality of nodes. In these standards, a grandmaster which is to be a standard of time is selected based on a Best Master Clock Algorithm (BMCA), and a slave that synchronizes with the grandmaster synchronizes with time delivered from the grandmaster. When a node with a higher priority than a priority of the grandmaster newly enters a system that is running, each node performs mediation to select the grandmaster, and recognizes the node with a high priority that has newly entered as the grandmaster. And, each node synchronizes with the node with the high priority that has newly entered. At this time, there is a case where a switch in grandmasters that is unintentional occurs. A process for a selection of a grandmaster by mediation is called "grandmaster mediation".

In the technology of Patent Literature 1, a network connection device is provided between a grandmaster and a slave node. And, in the technology of Patent Literature 1, a new node is connected to the network connection device, and when a best timing synchronization request is sent from the new node, the network connection device blocks the best timing synchronization request.

CITATION LIST

Patent Literature

Patent Literature 1: JP 2013-085278 A

SUMMARY OF INVENTION

Technical Problem

In Patent Literature 1, a switch in grandmasters that is unintentional can be prevented. There is, however, a risk where even when a communication apparatus with a high priority and high accuracy newly enters a communication system, and when a time difference between the communication apparatus with high accuracy and a current grandmaster is small, time synchronization cannot be done with the communication apparatus with high accuracy.

The present invention aims to prevent a switch in grandmasters that is unintentional and when a time difference between a communication apparatus that newly entered and a current grandmaster is small, to enable time synchronization with the communication apparatus.

Solution to Problem

A communication apparatus according to the present invention is a communication apparatus that is included in a communication system that selects from a plurality of communication apparatuses, a grandmaster that is to be a standard of time of the plurality of communication apparatuses, the communication system including the plurality of communication apparatuses. The communication apparatus includes:

a priority verification unit to obtain from, among the plurality of communication apparatuses, other communication apparatus other than a current grandmaster, a grandmaster mediation message that is a grandmaster mediation message used for selecting the grandmaster and that includes a priority of the other communication apparatus, and to verify whether or not the priority of the other communication apparatus is higher than a priority of the current grandmaster; and a mediation unit, when the priority of the other communication apparatus is verified as being higher than the priority of the current grandmaster, to obtain a synchronization message including time of the other communication apparatus from the other communication apparatus before switching the other communication apparatus to the grandmaster, to calculate difference between the time of the other communication apparatus and time of the communication apparatus, and when the difference is less than a threshold, to switch the other communication apparatus to the grandmaster.

Advantageous Effects of Invention

According to the communication apparatus of the present invention, an effect is provided where when a time difference between a communication apparatus that newly entered and a current grandmaster is small, to enable time synchronization with the communication apparatus.

BRIEF DESCRIPTION OF DRAWINGS

FIG. 7 is an operation flow diagram of a communication apparatus according to Embodiment 2.

FIG. 8 is an operation flow diagram of the communication apparatus according to Embodiment 2.

DESCRIPTION OF EMBODIMENTS

Embodiments of the present invention will be described hereinafter using the drawings. Throughout the drawings, the same or corresponding portions are denoted by the same reference signs. In the description of the embodiments, description of the same or corresponding portions will be suitably omitted or simplified.

Embodiment 1

Figure 1:
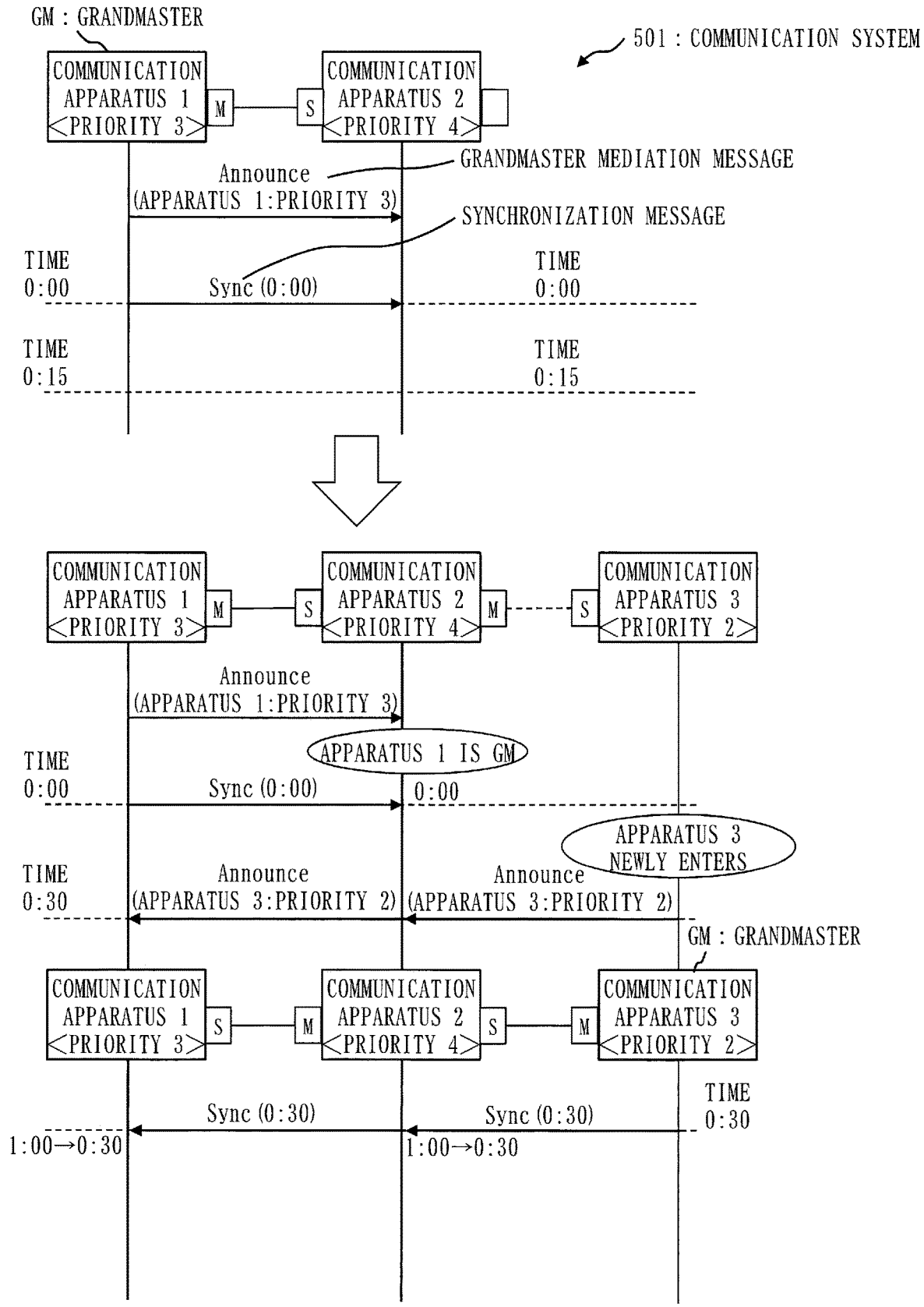
FIG. 1 is a sequence diagram of a communication system to compare with a communication system according to Embodiment 1.

FIG. 1 is a diagram illustrating operation sequences of a communication system 501 to compare with a communication system according to the present embodiment.

The communication system 501 in FIG. 1 and the communication system according to the present embodiment have adopted a standard regarding time synchronization technology such as IEEE1588 or IEEE802.1AS. In these standards a grandmaster is selected by grandmaster mediation using a BMCA, and a slave other than the grandmaster synchronizes with time delivered from the grandmaster.

In the operation sequence in an upper tier in FIG. 1, the communication system 501 includes a communication apparatus 1 of priority 3 and a communication apparatus 2 of priority 4. The communication apparatus 1 is a grandmaster GM that is to be a standard of time of the communication system 501. A grandmaster mediation message Announce is transmitted to the communication apparatus 2 from the communication apparatus 1, and then, a synchronization message Sync is transmitted. As a result, time synchronization of the communication apparatus 1 and the communication apparatus 2 is completed. Hereinafter, there are cases where the grandmaster mediation message Announce is described simply as Announce. There are cases where the synchronization message Sync is described simply as Sync.

The Announce is a frame for performing the grandmaster mediation. The Sync is a frame sent from the grandmaster and is for performing time synchronization of the communication system. In the upper tier in FIG. 1, it is illustrated that the grandmaster mediation is completed, and that the time synchronization has been performed between the communication apparatus 1 and the communication apparatus 2. "M" represents MasterPort. MasterPort is a port that transmits the Announce and the Sync. "S" represents SlavePort. SlavePort is a port that receives the Sync. Here, a value of priority indicates that the smaller the value of priority, the higher a priority is to be the grandmaster.

In the operation sequence in a lower tier in FIG. 1, in a state where the grandmaster mediation of the communication apparatus 1 and the communication apparatus 2 has been completed, a state where a communication apparatus 3 newly enters the communication system 501 is illustrated. The communication apparatus 3 that has newly entered transmits an Announce that indicates that priority 2 of the communication apparatus 3 is higher than priority 3 of the communication apparatus 2 that is the grandmaster, and starts the grandmaster mediation. When the grandmaster mediation is completed, the communication apparatus 3 transmits a Sync to make time of the communication apparatus 1 and the communication apparatus 2 synchronize with time of the communication apparatus 3. At this time, when a switch in the grandmasters is a switch that is unintentional, the communication apparatus 2 can prevent the switch by blocking the Announce of the communication apparatus 3 or by a technique of ignoring. By such a technique, however, even when difference in time between the communication apparatus 3 and the communication apparatus 2 is small enough that there is no problem, the communication apparatus 3 with a high priority cannot be made the grandmaster.

In the present embodiment, an aspect of a communication system that can make the communication apparatus 3 with the high priority the grandmaster when the difference in time between the communication apparatus 3 and the communication apparatus 2 is small, will be described.

A method to conclude that a communication apparatus is already synchronized with the grandmaster is as follows. When the communication apparatus is a slave, the communication apparatus has SlavePort. When SlavePort is not changed for more than or equal to a certain amount of time, the communication apparatus concludes that the communication apparatus has synchronized with the grandmaster at least once.

When the communication apparatus is the grandmaster, a method to conclude that the communication apparatus is already synchronized with the communication apparatus which is the slave is as follows. When the Announce is not received from MasterPort for more than or equal to a certain amount of time, the communication apparatus concludes that the BMCA has ended and the slave is synchronized.

*Description of Configuration*

A configuration of a communication apparatus 100 according to the present embodiment will be described using FIG. 2.

First, a communication system 500 according to the present embodiment includes a plurality of communication apparatuses 100. The communication system 500 selects from the plurality of communication apparatuses 100, the grandmaster that is to be a standard of time of the plurality of communication apparatuses 100.

The communication apparatus 100 is a computer. The communication apparatus 100 includes a processor 910 and other hardware such as a memory 921, an auxiliary storage device 922, an input interface 930, an output interface 940, and a communication control unit 950. Furthermore, the communication apparatus 100 includes hardware such as network ports 961 and 962, and a system clock 970. The processor 910 is connected to other hardware via signal lines, and controls these other hardware. Although the network ports 961 and 962, and the system clock 970 are not illustrated in FIG. 2, configuration of these will be described using FIG. 3 to be described later.

The communication apparatus 100 includes, as functional elements, a priority verification unit 110 and a mediation unit 120. An apparatus priority 21, a grandmaster priority 22, and a threshold 23 are stored in the memory 921.

Functions of the priority verification unit 110 and the mediation unit 120 are realized by software.

The processor 910 is a device that executes a communication program. The communication program is a program that realizes the functions of the priority verification unit 110 and the mediation unit 120.

The processor 910 is an IC (Integrated Circuit) that performs a calculation process. Specific examples of the processor 910 are a CPU (Central Processing Unit), a DSP (Digital Signal Processor), and a GPU (Graphics Processing Unit).

The memory 921 is a storage device that stores data temporarily. A specific example of the memory 921 is an SRAM (Static Random Access Memory) or a DRAM (Dynamic Random Access Memory).

The auxiliary storage device 922 is a storage device that stores data. A specific example of the auxiliary storage device 922 is an HDD. The auxiliary storage device 922 may be a portable storage medium such as an SD (registered trademark) memory card, a CF, a NAND flash, a flexible disc, an optical disc, a compact disc, a Blu-ray (registered trademark) disc, or a DVD. HDD is an abbreviation for Hard Disk Drive. SD (registered trademark) is an abbreviation for Secure Digital. CF is an abbreviation for CompactFlash (registered trademark). DVD is an abbreviation for Digital Versatile Disk.

The input interface 930 is a port connected to an input device such as a mouse, a keyboard, or a touch panel. The input interface 930 is, specifically, a USB (Universal Serial Bus) terminal. The input interface 930 may be a port connected to a LAN (Local Area Network).

The output interface 940 is a port to which a cable of an output device such as a display is connected. The output interface 940 is, specifically, a USB terminal or an HDMI (registered trademark) (High Definition Multimedia Interface) terminal. The display is, specifically, an LCD (Liquid Crystal Display).

The communication program is read into the processor 910 and executed by the processor 910. Not only the communication program but also an OS (Operating System) is stored in the memory 921. The processor 910 executes the communication program while executing the OS. The communication program and the OS may be stored in the auxiliary storage device 922. The communication program and the OS stored in the auxiliary storage device 922 are loaded into the memory 921 and executed by the processor 910. A part or all of the communication program may be built into the OS.

The communication apparatus 100 may include a plurality of processors that replace the processor 910. These plurality of processors share execution of the communication program. Each processor is, as with the processor 910, a device that executes the communication program.

Data, information, signal values, and variable values used, processed, or outputted by the communication program are stored in the memory 921, the auxiliary storage device 922, or a register or a cache memory in the processor 910.

"Unit" of each unit of the priority verification unit 110 and the mediation unit 120 may be replaced with "process", "procedure", or "step". "Process" of a priority verification process and a mediation process may be replaced with "program", "program product", or "computer-readable storage medium having recorded a program".

The communication program makes a computer execute each process, each procedure, or each step being "process", "procedure", or "step" with which "unit" of each unit described above is replaced. A communication method is a method performed by the communication apparatus 100 executing the communication program.

The communication program may be provided being stored in a computer-readable storage medium. The communication program may be provided as a program product.

Figure 2:
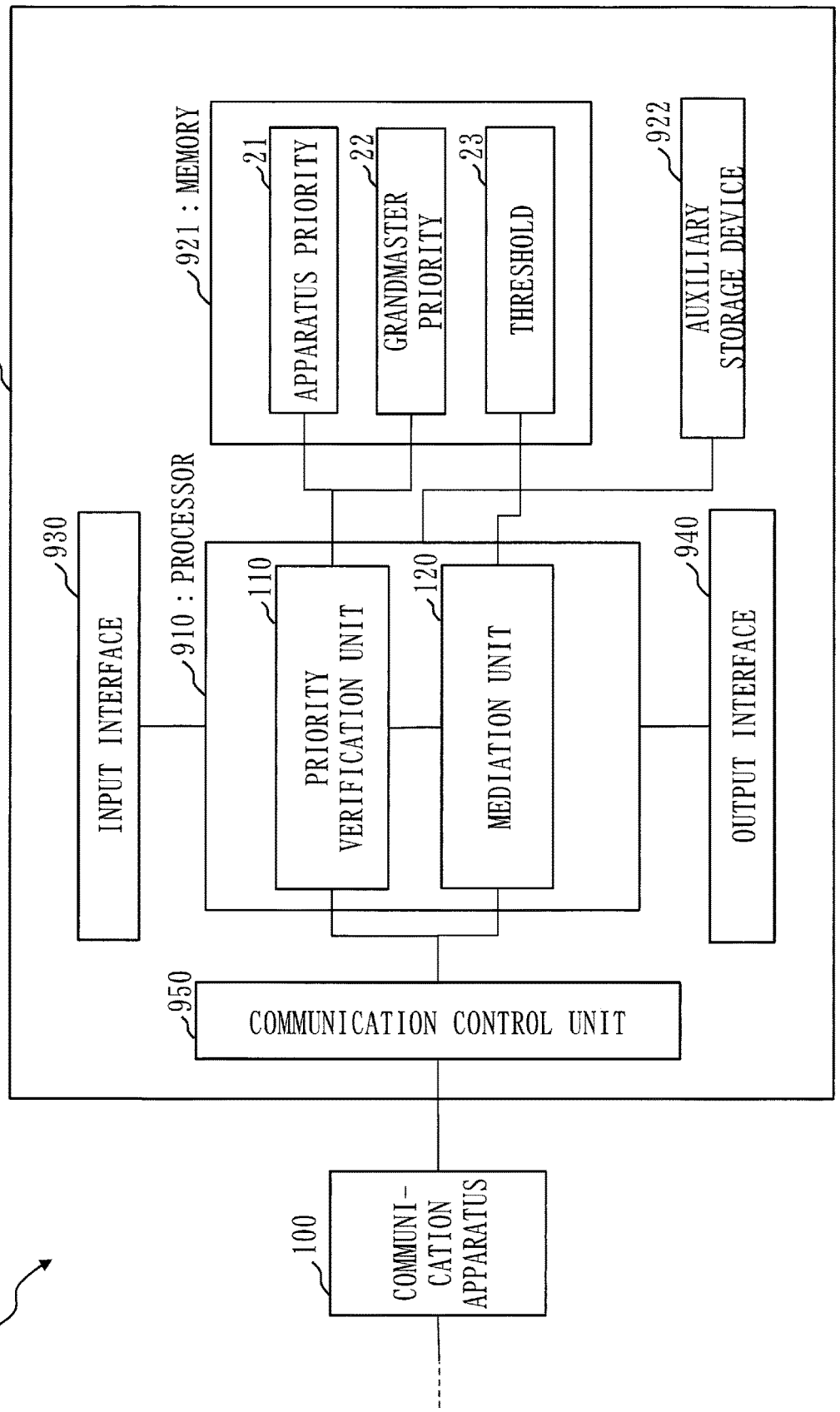
FIG. 2 is a configuration diagram of a communication apparatus according to Embodiment 1.
Figure 3:
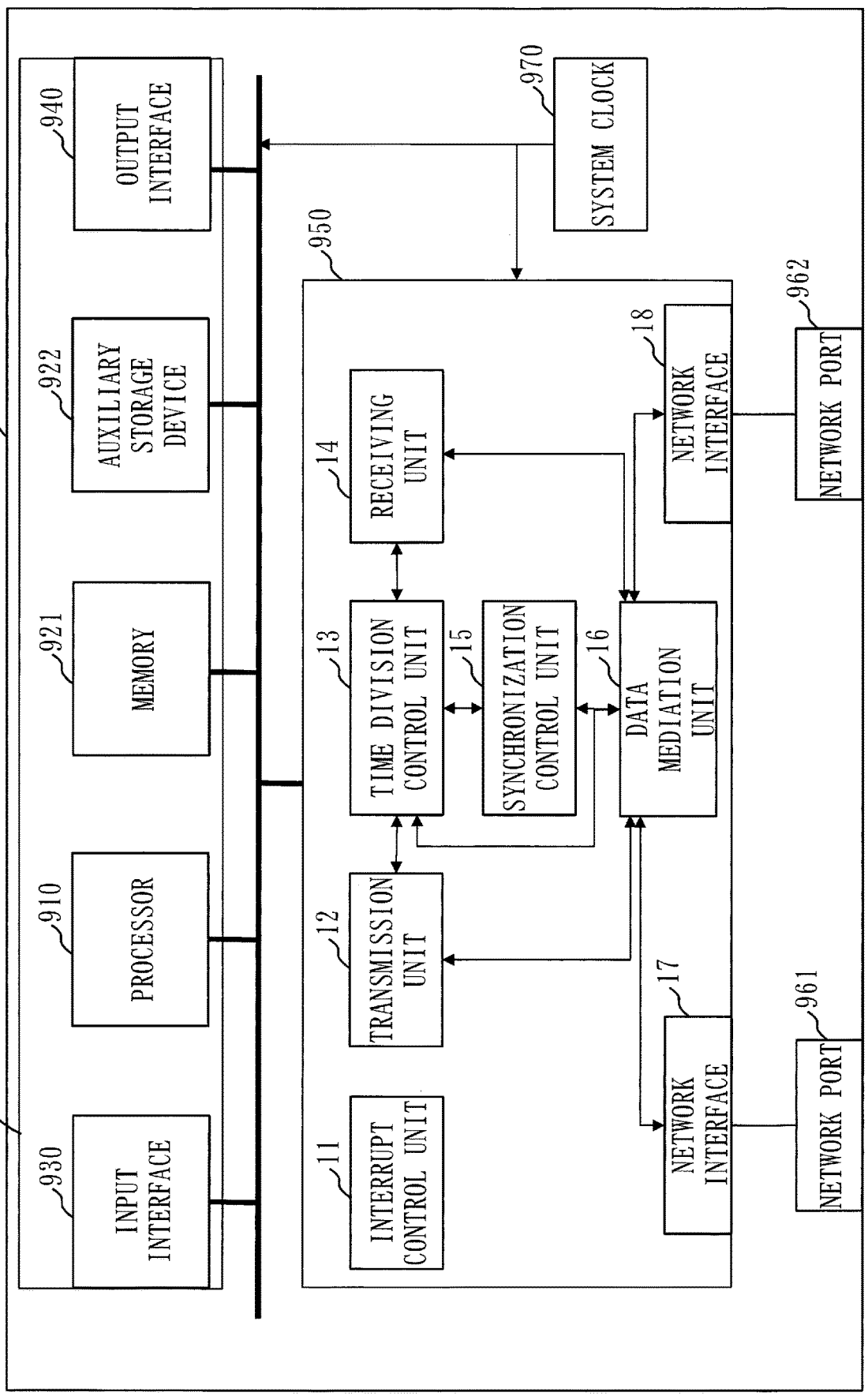
FIG. 3 is a detailed configuration diagram of hardware of the communication apparatus according to Embodiment 1.

FIG. 3 is a diagram illustrating a detailed configuration of hardware of the communication apparatus 100 according to the present embodiment. The hardware described in FIG. 2 will be described in more detail using FIG. 3.

The processor 910, the memory 921, the auxiliary storage device 922, the input interface 930, and the output interface 940 are included in a microcomputer 900.

The communication control unit 950 includes an interrupt control unit 11, a transmission unit 12, a time division control unit 13, a receiving unit 14, a synchronization control unit 15, a data mediation unit 16, and network interfaces 17 and 18. The network interface 17 is connected to the network port 961. The network interface 18 is connected to the network port 962.

The interrupt control unit 11 performs outputting of an interrupt to the processor 910 and mask control of an interrupt.

The transmission unit 12 performs generation of a communication frame. Timing is inputted to the transmission unit 12 by the time division control unit 13, and the transmission unit 12 performs control of a start of transmission.

The time division control unit 13 performs control of a communication cycle and a time slot based on time inputted by the synchronization control unit 15.

The receiving unit 14 performs a receiving process of a frame. The receiving unit 14 extracts time information from a synchronization frame, that is, a synchronization message.

The synchronization control unit 15 outputs a time counter value to the time division control unit 13. The synchronization control unit 15 performs retaining of transmission time and receiving time of the synchronization frame.

The data mediation unit 16 performs transmission mediation of the communication frame. The data mediation unit 16 performs relay control based on time slot information inputted by the time division control unit 13. The data mediation unit 16 performs verification of type of the frame received. The data mediation unit 16 notifies the synchronization control unit 15 of receiving and transmission of the synchronization frame.

The network interfaces 17 and 18 notify the synchronization control unit 15 of the transmission and the receiving of the synchronization frame. The network interfaces 17 and 18 forward to the network ports 961 and 962, a frame to transmit. The network interfaces 17 and 18 forward the frame received from the network ports 961 and 962 to the data mediation unit 16.

The network ports 961 and 962 are physical ports that are connected to a network.

The system clock 970 inputs a clock signal into the communication control unit 950 and an internal bus by an oscillator.

*Description of Functions*

The priority verification unit 110 of the communication apparatus 100 obtains from, among a plurality of communication apparatuses, other communication apparatus other than a current grandmaster, the grandmaster mediation message Announce. The grandmaster mediation message Announce is used for selecting the grandmaster. A priority of the other communication apparatus, the other communication apparatus being a transmission source, is included in the grandmaster mediation message Announce. Here, the other communication apparatus, specifically, is a communication apparatus that newly enters the communication system 500. The priority verification unit 110 verifies whether or not the priority of the other communication apparatus is higher than the grandmaster priority 22, a priority of the current grandmaster.

A priority of the grandmaster in the communication system 500 is set in the grandmaster priority 22. In IEEE1588 or IEEE802.1AS, the grandmaster priority 22 is represented in a parameter of Priority 1.

Set in the apparatus priority 21 is a priority of itself, itself being the communication apparatus 100.

Usually, when the Announce is transmitted from the other communication apparatus, and found that the priority of the other communication apparatus is higher than the priority of the current grandmaster, the communication apparatus performs a process that switches the other communication apparatus to the grandmaster.

When the priority of the other communication apparatus is verified as being higher than the grandmaster priority 22, the mediation unit 120 of the communication apparatus 100 according to the present embodiment obtains the synchronization message Sync including time of the other communication apparatus from the other communication apparatus before switching the other communication apparatus to the grandmaster. The mediation unit 120 calculates difference between time of the other communication apparatus and time of the communication apparatus 100, and when the difference is less than the threshold 23, the mediation unit 120 switches the other communication apparatus to the grandmaster. When the difference is more than or equal to the threshold 23, the mediation unit 120 does not switch the other communication apparatus to the grandmaster. That is, the communication apparatus 100 is in a state where the communication apparatus 100 is synchronizing time with the current grandmaster.

A greatest value of difference allowable without a problem even when time is synchronized with a communication apparatus that newly entered is set in the threshold 23.

*Description of Operation*

Figure 4:
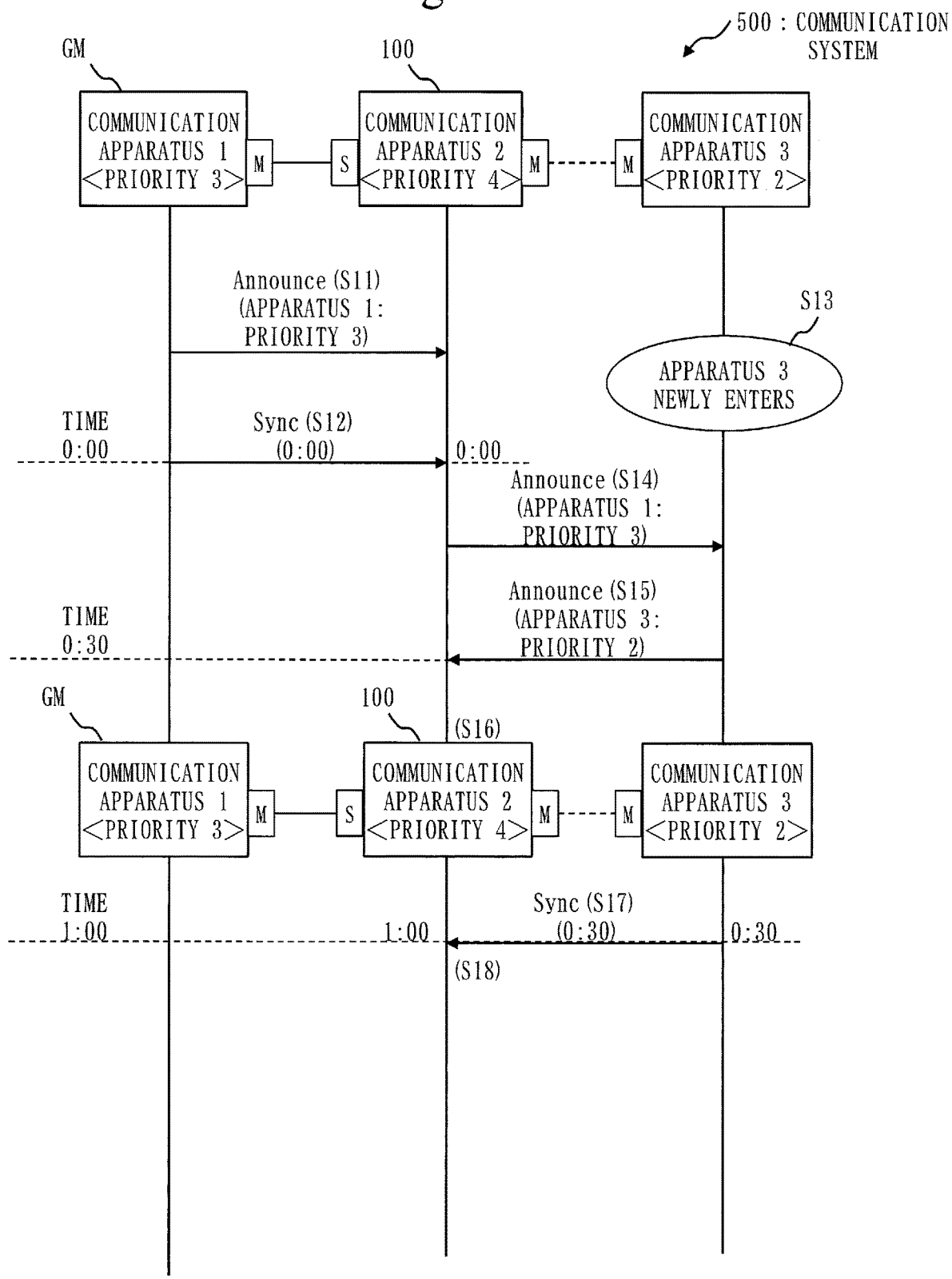
FIG. 4 is a sequence diagram of the communication system according to Embodiment 1.

FIG. 4 is a diagram illustrating an operation sequence of the communication system 500 according to the present embodiment. Operation of the communication system 500 according to the present embodiment will be described using FIG. 4.

In FIG. 4, the communication system 500 includes a plurality of communication apparatuses. The plurality of communication apparatuses are, the communication apparatus 1, the communication apparatus 2, and the communication apparatus 3. Here, the communication apparatus 2 will be described as the communication apparatus 100. The communication apparatus 3 is an example of the other communication apparatus that newly enters the communication system 500.

In step S11, the grandmaster mediation message Announce is transmitted from the communication apparatus 1 to the communication apparatus 2. Since a priority of the communication apparatus 1 is 3 and the priority of the communication apparatus 2 is 4, the communication apparatus 1 becomes the grandmaster GM.

In step S12, the synchronization message Sync is transmitted from the communication apparatus 1 to the communication apparatus 2, and the communication apparatus 2 synchronizes time with the communication apparatus 1.

In step S13, the communication apparatus 3 newly enters the communication system 500. The priority of the communication apparatus 3 is 2. That is, the priority of the communication apparatus 3 that newly entered is higher than the priority of the communication apparatus 1 that is the current grandmaster. For the communication apparatus 2, the communication apparatus 3 becomes, among the plurality of communication apparatuses, the other communication apparatus other than the communication apparatus 1 that is the current grandmaster.

In step S14, the Announce including that the priority of the communication apparatus 1 is 3 is transmitted from the communication apparatus 2 to the communication apparatus 3.

In step S15, the Announce including that the priority of the communication apparatus 3 is 2 is transmitted from the communication apparatus 3 to the communication apparatus 2. As described above, the grandmaster mediation is performed between the communication apparatus 2 and the communication apparatus 3.

In step S16, when the communication apparatus 2 verifies that the priority of the communication apparatus 3 is higher than the priority of the current grandmaster, the communication apparatus 2 stops the grandmaster mediation. That is, the communication apparatus 2 does not perform a process to switch the communication apparatus 3 to the grandmaster although the priority of the communication apparatus 3 is higher than the grandmaster priority 22. Specifically, the communication apparatus 2 does not change a port connected to the communication apparatus 3 from MasterPort. The communication apparatus 2 waits to switch the grandmaster until receiving the synchronization message Sync from the communication apparatus 3.

In step S17, the communication apparatus 2 receives the synchronization message Sync from the communication apparatus 3.

In step S18, when the synchronization message Sync from the communication apparatus 3 is received, the communication apparatus 2 calculates the difference between time of the communication apparatus 3 and time of the communication apparatus 2. When the difference in time calculated is exceeding the threshold 23, the communication apparatus 2 does not perform the switch in the grandmasters, and continues to operate recognizing the communication apparatus 1 as the grandmaster. In the example in FIG. 4, assume that the threshold 23 is ±15 minutes. According to the synchronization message Sync in step S17, the time of the communication apparatus 3 is 0:30. The time of the communication apparatus 2 is 1:00. Consequently, a time difference between the communication apparatus 2 and the communication apparatus 3 is −30 minutes. Consequently, the communication apparatus 2 verifies that the difference in time is more than the threshold 23, ignores the synchronization message Sync of the communication apparatus 3, and continues to operate recognizing the communication apparatus 1 as the grandmaster.

As described above, in the communication system 500 according to the present embodiment, even when a communication apparatus with a high priority newly enters, the communication apparatus 100 ignores the BMCA between the communication apparatus that newly entered when a time difference between the communication apparatus 100 and the communication apparatus is not verified as being less than a threshold.

Next, operation of the communication apparatus 100 according to the present embodiment will be described.

Figure 5:
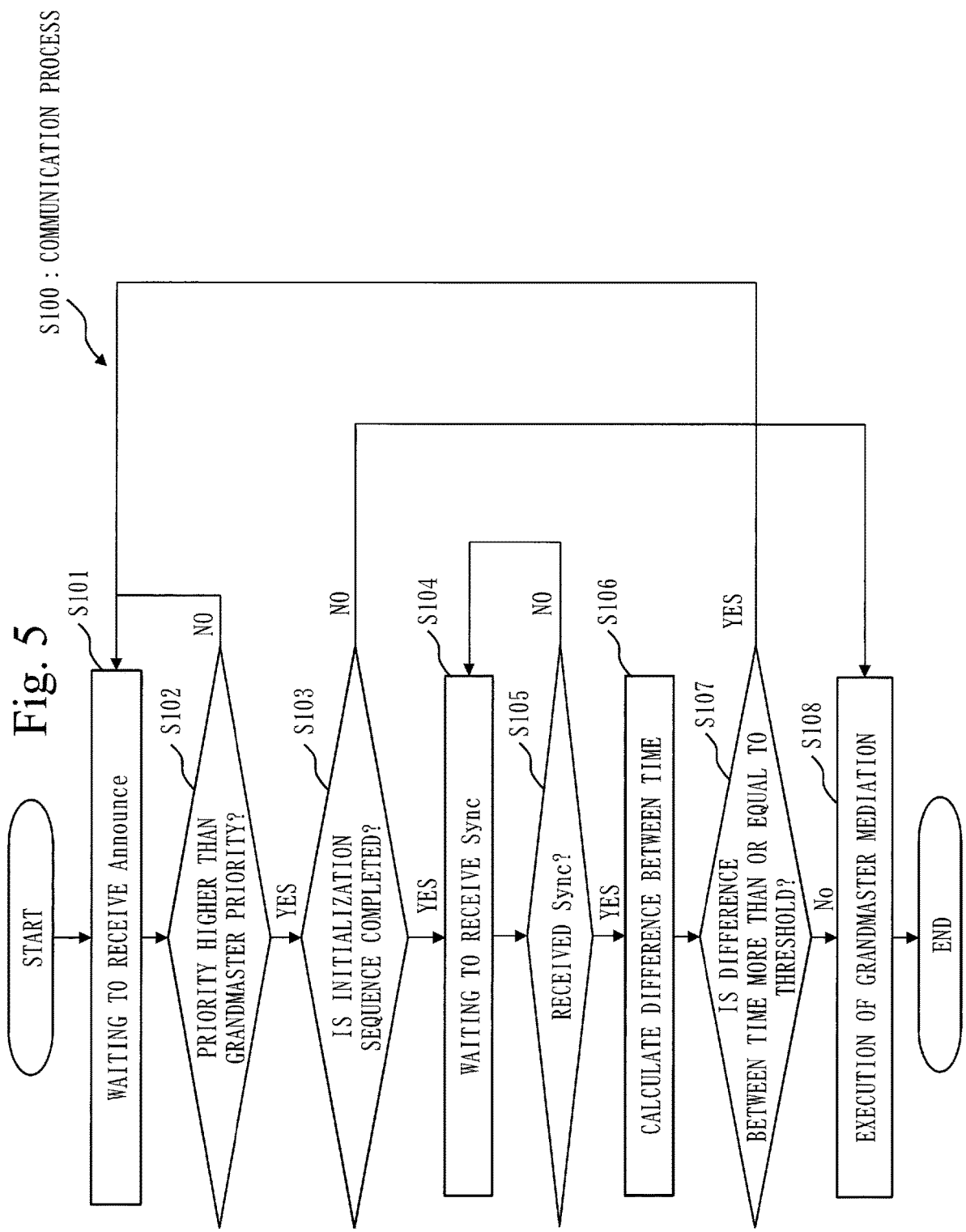
FIG. 5 is an operation flow diagram of the communication apparatus according to Embodiment 1.

FIG. 5 is an operation flow diagram of the communication apparatus 100 according to the present embodiment. A communication process S100 of the communication apparatus 100 will be described using FIG. 5.

In step S101, the communication apparatus 100 is in a waiting to receive the grandmaster mediation message Announce state.

In step S102, the priority verification unit 110 of the communication apparatus 100 obtains the Announce through the communication control unit 950. A priority of a communication apparatus (hereinafter, referred to as other communication apparatus), the communication apparatus being a transmission source of the Announce, is included in the Announce. The priority verification unit 110 verifies whether or not the priority of the other communication apparatus included in the Announce is higher than the grandmaster priority 22 that is the priority of the current grandmaster. When the priority of the other communication apparatus included in the Announce is lower than the grandmaster priority 22, the process returns to step S101 since the switch in the grandmasters is not necessary. When the priority of the other communication apparatus included in the Announce is higher than or equal to the grandmaster priority 22, the process proceeds to step S103.

In step S103, the mediation unit 120 of the communication apparatus 100 verifies whether or not an initialization sequence is completed. When the initialization sequence is not completed, the mediation unit 120 executes the grandmaster mediation, that is, the BMCA, to perform a selection of the grandmaster. When the initialization sequence is completed, that is, when the current grandmaster is already selected, the process proceeds to step S104. A specific example of a method to verify whether or not the initialization sequence is completed is as follows. When receiving a notification of initialization sequence complete from a master station that performs network management, the communication apparatus 100 may verify that the initialization sequence is already completed. Or, the communication apparatus 100 may provide a timer that monitors completion of the initialization sequence and verify that the initialization sequence is already completed when this timer times out.

In step S104, the mediation unit 120 of the communication apparatus 100 enters a waiting to receive the synchronization message Sync state without executing the grandmaster mediation, that is, the BMCA. That is, the mediation unit 120 enters the waiting to receive the Sync state before switching the other communication apparatus to the grandmaster.

In step S105, on obtaining the Sync through the communication control unit 950, the mediation unit 120 proceeds to step S106.

In step S106, the mediation unit 120 calculates the difference between time of the other communication apparatus and time of the communication apparatus 100. In the example in FIG. 4, the communication apparatus 100 is the communication apparatus 2, and the other communication apparatus is the communication apparatus 3 that newly entered. Assume that the threshold 23 is ±15 minutes. According to the Sync, the time of the communication apparatus 3 is 0:30. The time of the communication apparatus 2 is 1:00. Consequently, the mediation unit 120 calculates that the difference in time between the communication apparatus 2 and the communication apparatus 3=0:30−1:00=−30 minutes.

In step S107, the mediation unit 120 compares an absolute value of difference in time with the threshold 23.

In a case where the absolute value of difference in time is more than or equal to the threshold 23, the process returns to step S101. That is, the mediation unit 120 does not execute the grandmaster mediation and returns again to the waiting to receive the Announce state. In the example in FIG. 4, at this point in time, the grandmaster is still the communication apparatus 1.

On the other hand, in a case where the absolute value of difference in time is less than the threshold 23, the process proceeds to step S108.

In step S108, the mediation unit 120 continues with the grandmaster mediation, that is, the BMCA. As a result, the mediation unit 120 switches the other communication apparatus to the grandmaster. For example, in step S17 in FIG. 4, according to the Sync, assume that the time of the communication apparatus 3 is 0:55. At this time, the difference in time becomes −5 minutes, the communication apparatus 2 verifies that the difference in time is less than the threshold 23, and switches the communication apparatus 3 that newly entered to the grandmaster.

*Other Configurations*

In the present embodiment, the functions of the priority verification unit 110 and the mediation unit 120 are realized by software. As a variation, the functions of the priority verification unit 110 and the mediation unit 120 may be realized by hardware.

The communication apparatus 100 may include an electronic circuit in place of the processor 910 in FIG. 2 and FIG. 3. The electronic circuit is a dedicated electronic circuit to realize the functions of the priority verification unit 110 and the mediation unit 120.

The electronic circuit is, specifically, a single circuit, a composite circuit, a programmed processor, a parallel programmed processor, a logic IC, a GA, an ASIC, or an FPGA. GA is an abbreviation for Gate Array. ASIC is an abbreviation for Application Specific Integrated Circuit. FPGA is an abbreviation for Field-Programmable Gate Array.

The functions of the priority verification unit 110 and the mediation unit 120 may be realized by one electronic circuit or may be realized by being distributed to a plurality of electronic circuits.

As another variation, a part of the functions of the priority verification unit 110 and the mediation unit 120 may be realized by the electronic circuit and the rest of the functions may be realized by software.

Each of the processor and the electronic circuit is also called a processing circuitry. That is, in the communication apparatus 100, the functions of the priority verification unit 110 and the mediation unit 120 are realized by the processing circuitry.

*Description of Effect of Embodiment*

The communication apparatus 100 of the communication system 500 according to the present embodiment includes a time synchronization function and a grandmaster mediation function. The communication apparatus 100 has functions to calculate the time difference between the communication apparatus 100 and the communication apparatus that newly entered the communication system 500, and to compare the time difference with the threshold. In a case where the time difference is more than or equal to the threshold, the communication apparatus 100 does not switch the communication apparatus that newly entered to the grandmaster, and does not synchronize with the communication apparatus that newly entered. In a case where the time difference is less than the threshold, the communication apparatus 100 switches the communication apparatus that newly entered to the grandmaster.

In other words, in the communication apparatus 100 of the communication system 500 according to the present embodiment, even when receiving a grandmaster mediation message of the communication apparatus that newly entered, the grandmaster mediation, that is, the BMCA, is not executed immediately, and the receiving of the synchronization message is waited for. And, the communication apparatus 100 calculates the time difference between time notified by the synchronization message from the communication apparatus that newly entered and time of the communication apparatus 100, and when the time difference is more than or equal to the threshold, the communication apparatus 100 does not switch the communication apparatus that newly entered to the grandmaster, and does not synchronize time with the communication apparatus that newly entered.

According to the communication system 500 of the present embodiment, a switch in grandmasters that is unintentional can be prevented, and when a time difference between a communication apparatus that newly entered and a current grandmaster is small, synchronization with the communication apparatus is enabled. Consequently, according to the communication system 500 of the present embodiment, when a communication apparatus with a high priority and high accuracy newly enters, the communication apparatus that newly entered can be ignored when the time difference is big. On the other hand, according to the communication system 500 of the present embodiment, when a communication apparatus with a high priority and high accuracy newly enters, time synchronization with the communication apparatus that newly entered can be done when the time difference is within a range that is not problematic.

Embodiment 2

In the present embodiment, parts different from those of Embodiment 1 will mainly be described. The same configurations as those of Embodiment 1 are denoted by the same reference signs, and the descriptions are omitted.

*Description of Configuration*

A configuration of a communication system according to the present embodiment, is the same as that of Embodiment 1.

In Embodiment 1, when the difference in time is more than or equal to the threshold, the mediation unit continued the process having the current the grandmaster remaining as the grandmaster without performing the switch in the grandmasters. In the present embodiment, when difference in time is more than or equal to the threshold, a system to make a communication apparatus that newly entered selected by the communication system as a grandmaster while maintaining time of a current communication system, will be described.

In the present embodiment, a communication apparatus 100a sets a priority of the communication apparatus 100a to a highest priority from a state where the communication apparatus that newly entered is not switched to the grandmaster. Having the priority of the communication apparatus 100a to the highest priority and in a state where the communication apparatus 100a is the grandmaster, the communication apparatus 100a transmits the synchronization message Sync. After that, the communication apparatus 100a makes a grandmaster priority, that is, the priority of the communication apparatus 100a return to an original value of priority. As a result, in a communication system 500a, time synchronization is performed with the communication apparatus that newly entered as the grandmaster.

Functions of a mediation unit 120 of the communication apparatus 100a according to the present embodiment will be described. When the difference is more than or equal to the threshold 23, the mediation unit 120 sets an apparatus priority 21 that is the priority of the communication apparatus 100a, higher than the priority of the other communication apparatus. As a result, the priority of the communication apparatus 100a becomes a highest priority in the communication system 500a. As described above, the mediation unit 120 makes the communication apparatus 100a be selected as the grandmaster. The mediation unit 120, as the communication apparatus 100a being the grandmaster, makes the apparatus priority 21 return to the original value when synchronization of the plurality of communication apparatuses is completed. After that, the mediation unit 120 may perform the grandmaster mediation to make the other communication apparatus be selected as the grandmaster by transmitting the grandmaster mediation message including the apparatus priority 21.

*Description of Operation*

Figure 6:
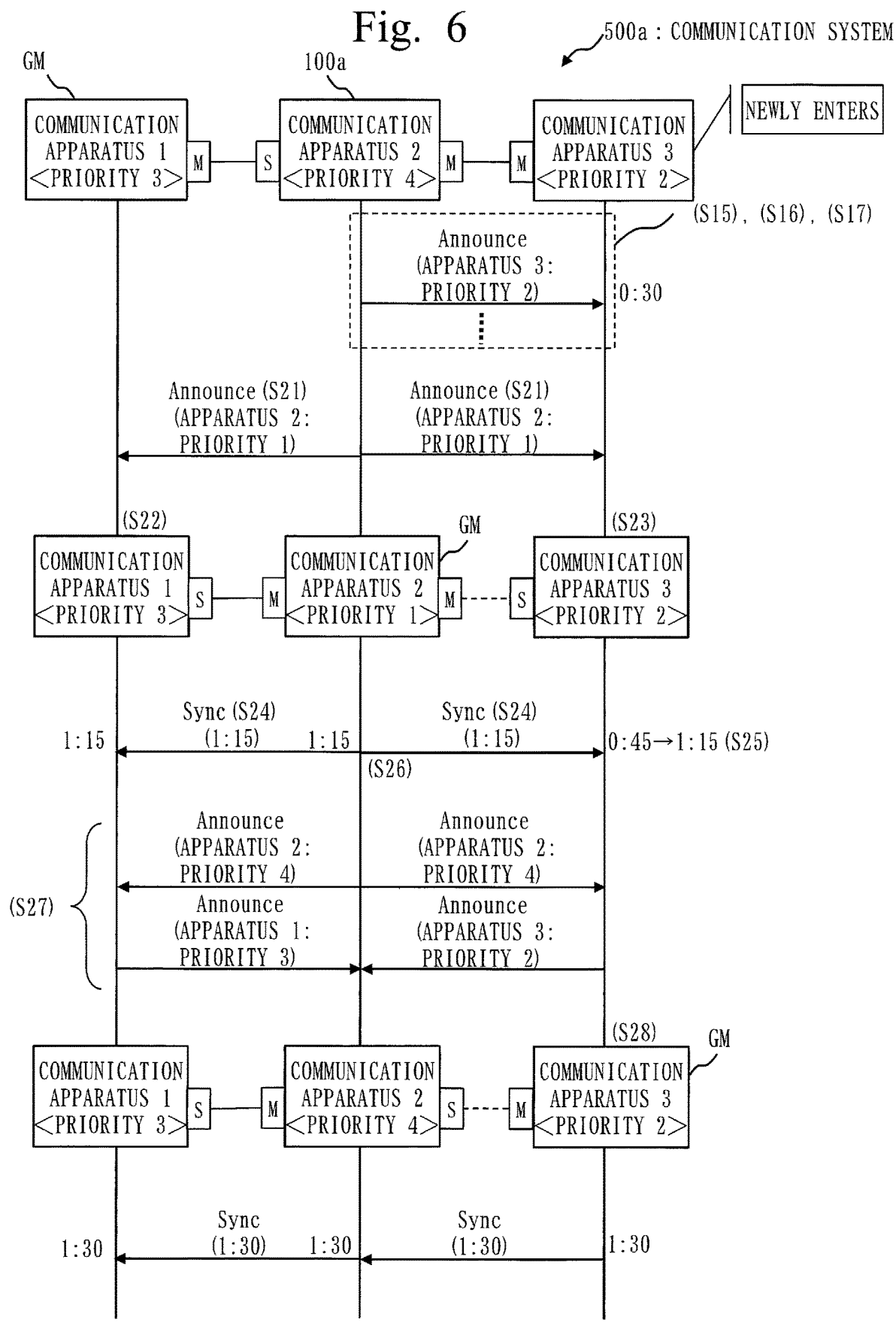
FIG. 6 is a sequence diagram of a communication system according to Embodiment 2.

FIG. 6 is a diagram illustrating an operation sequence of the communication system 500a according to the present embodiment. By using FIG. 6, operation of the communication system 500a according to the present embodiment will be described.

In FIG. 6, the communication system 500a includes a plurality of communication apparatuses. The plurality of communication apparatuses are a communication apparatus 1, a communication apparatus 2, and a communication apparatus 3. The communication apparatus 100a will be described as the communication apparatus 2. The communication apparatus 3 is an example of other communication apparatus that newly enters the communication system 500a.

Step S15 to step S17 are the same as step S15 to step S17 in FIG. 4. In the present embodiment, processes after step S15 to step S17 in FIG. 4 differ from those of Embodiment 1.

In step S15, the communication apparatus 2 receives from the communication apparatus 3, an Announce that includes that a priority of the communication apparatus 3 is 2. At this point in time, a priority of the communication apparatus 1 is 3, a priority of the communication apparatus 2 is 4, and a current grandmaster is the communication apparatus 1.

In step S16, when the communication apparatus 2 verifies that the priority of the communication apparatus 3 is higher than a priority of the current grandmaster, the communication apparatus 2 stops the grandmaster mediation.

In step S17, the communication apparatus 2 receives a synchronization message Sync from the communication apparatus 3. The processes up to here are the same as those of Embodiment 1.

In step S21, when the Sync is received from the communication apparatus 3, the communication apparatus 2 calculates difference between time of the communication apparatus 3 and time of the communication apparatus 2. When the difference in time calculated is more than or equal to the threshold 23, the communication apparatus 2 does not perform a switch in the grandmasters. At this time, the communication apparatus 2 raises the priority of the communication apparatus 2 from 4 to 1. That is, the communication apparatus 2 raises the apparatus priority 21 of the communication apparatus 2 higher than a current grandmaster priority 22 of the communication system 500a and higher than the priority of the communication apparatus 3 that newly entered. The communication apparatus 2 transmits the grandmaster mediation message Announce with the priority of the communication apparatus 2 as 1.

In step S22, the communication apparatus 1 recognizes the communication apparatus 2 as the grandmaster.

In step S23, the communication apparatus 3 recognizes the communication apparatus 2 as the grandmaster.

In step S24, the communication apparatus 2 transmits the Sync.

In step S25, the communication apparatus 1 and the communication apparatus 3 receive the Sync from the communication apparatus 2, and synchronize time with the communication apparatus 2. At this point in time, the communication apparatus 2 is already synchronized with the communication apparatus 1. Consequently, the communication apparatus 3 synchronizes time with the communication apparatus 2.

In a specific example, the time of the communication apparatus 3 is corrected from 0:45 to 1:15 by the time synchronization.

In step S26, after transmitting the Sync, the communication apparatus 2 makes the priority of the communication apparatus 2 return to an original value of priority of 4. For example, after transmitting the Sync, the communication apparatus 2 makes the priority of the communication apparatus 2 return to the original value after a certain amount of time has passed. Or, the communication apparatus 2 may make the priority of the communication apparatus 2 return to the original value after transmitting the Sync and after the time synchronization in the communication system 500a is completed.

In step S27, after making the priority of the communication apparatus 2 return to the original value, the communication apparatus 2 performs the grandmaster mediation again.

In step S28, the communication apparatus 3 is recognized as the grandmaster. At this point in time, the communication apparatus 3 is already synchronized time with the communication apparatus 1. Consequently, even in a case where the communication apparatus 1 and the communication apparatus 2 synchronized time with the communication apparatus 3 after the communication apparatus 3 became the grandmaster, skipping of time does not occur.

As described above, according to the communication system 500a, the communication apparatus 3 that newly entered can be made to enter the communication system 500a without making the skipping of time occur.

FIG. 7 and FIG. 8 are operation flow diagrams of the communication apparatus 100a according to the present embodiment. A communication process S100a of the communication apparatus 100a will be described using FIG. 7 and FIG. 8.

Step S101 to step S108 in FIG. 7 are the same as step S101 to step S108 in FIG. 5. In step S107, however, in a case where the absolute value of difference in time is more than or equal to the threshold 23, the process proceeds to step S109.

In step S109, the mediation unit 120 of the communication apparatus 100a sets the apparatus priority 21 that is the priority of the communication apparatus 100a in a way that the apparatus priority 21 becomes the highest priority in the communication system 500a. In the example in FIG. 6, the mediation unit 120 is setting the priority of the communication apparatus 2 to priority 1 in a way that the priority is of higher priority than priority 3 of the communication apparatus 1 that is the grandmaster, and of higher priority than priority 2 of the communication apparatus 3 that newly entered. At this time, the mediation unit 120 has the original value of the apparatus priority 21 stored in the memory 921.

In step S110, after setting the priority of the communication apparatus 100a to the highest priority, the mediation unit 120 transmits the grandmaster mediation message Announce including the priority of the communication apparatus 100a from every port.

And, in step S111 and step S112, the mediation unit 120 waits until the grandmaster mediation is completed. That is, the mediation unit 120 waits until the BMCA ends. A specific example of a method to verify whether or not the BMCA has ended is as follows. When receiving a notification of a selection of the grandmaster complete from a master station that performs network management, the communication apparatus 100a verifies that the BMCA has ended. Or, the communication apparatus 100a may provide a timer that measures processing time of the BMCA, and verify that the BMCA has ended when this timer times out.

When the BMCA is verified as being ended, the process proceeds to step S113.

In step S113, the mediation unit 120 transmits the synchronization message Sync.

In step S114, the mediation unit 120 verifies whether or not transmission of the Sync is completed. In the present embodiment, the mediation unit 120 verifies that the time synchronization of the communication system 500a is completed when the transmission of the Sync is completed. When the transmission of the Sync by the communication system 500a is completed, the process proceeds to step S115.

In step S115, the mediation unit 120 makes the priority of the communication apparatus 100a, that is, the apparatus priority 21 return to the original value. After that, the mediation unit 120 may transmit the Announce including the apparatus priority 21 from every port. Since in the example in FIG. 6, the priority of the communication apparatus 2 returns to 4 and the priority of the communication apparatus 3 is 2, the communication apparatus 3 is selected as the grandmaster by the grandmaster mediation.

In the present embodiment, the communication apparatus 100a makes the priority of the communication apparatus 100a return to the original value by verifying whether or not the time synchronization is completed based on whether or not the transmission of the Sync is completed. The communication apparatus may, however, make a priority return to an original value after a certain amount of time has passed from a state where the priority is raised to a highest priority.

*Description of Effect of Embodiment*

According to the communication apparatus 100a of the communication system 500a of the present embodiment, when detecting that a communication apparatus with a high priority newly entered, the communication apparatus 100a raises the priority of the communication apparatus 100a to the highest priority. And, as the communication apparatus 100a being the grandmaster, the communication apparatus 100a makes the communication apparatus that newly entered synchronize time with the communication apparatus 100a. After that, the communication apparatus 100a makes the priority of the communication apparatus 100a return to the original. Consequently, according to the communication apparatus 100a of the communication system 500a of the present embodiment, the communication apparatus that newly entered can be made to be the grandmaster without making the skipping of time occur. Since when the communication apparatus that newly entered is a communication apparatus with a high priority and high accuracy, the communication apparatus that newly entered can be selected as the grandmaster without making the skipping of time occur, a communication system with high accuracy can be provided.

In Embodiments 1 and 2 above, each unit of the communication apparatus is described as an independent functional block. The configuration of the communication apparatus, however, does not have to be in the configuration as the embodiments described above. The functional block of the communication apparatus may be in any configuration if the functions described in the embodiments described above can be realized. The communication apparatus may be a system configured of a plurality of apparatuses, not of one apparatus.

Of Embodiments 1 and 2, a plurality of parts may be combined and executed. Or, of these embodiments, one part may be executed. In addition, these embodiments may be combined and executed in any manner, either fully or partially.

That is, in Embodiments 1 and 2, a free combination of the embodiments, a variation of any element in the embodiments, or omitting of any element in the embodiments is possible.

The embodiments described above are essentially preferred examples, and are not intended to limit the scope of the present invention, the scope of application of the present invention, and the scope of use of the present invention. Various changes are possible to be made to the embodiments described above as needed.

REFERENCE SIGNS LIST

11: interrupt control unit; 12: transmission unit; 13: time division control unit; 14: receiving unit; 15: synchronization control unit; 16: data mediation unit; 17, 18: network interface; 21: apparatus priority; 22: grandmaster priority; 23: threshold; 100, 100a: communication apparatus; 110: priority verification unit; 120: mediation unit; 500, 500a, 501: communication system; 900: microcomputer; 910: processor; 921: memory; 922: auxiliary storage device; 930: input interface; 940: output interface; 950: communication control unit; 961, 962: network port; 970: system clock; Announce: grandmaster mediation message; Sync: synchronization message; GM: grandmaster.

The invention claimed is:

1. A device configured as one of a plurality of communication apparatuses that is included in a communication system that selects, from the plurality of communication apparatuses, a grandmaster that is to be a standard of time of the plurality of communication apparatuses, the device comprising:
processing circuitry to:
obtain from a new communication apparatus not part of the plurality of communication apparatuses, a grandmaster mediation message that is a grandmaster mediation message used for selecting the grandmaster and that includes an assigned priority of the new communication apparatus, and verify whether or not the priority of the new communication apparatus is higher than an assigned priority of a current grandmaster,
when the priority of the new communication apparatus is verified as being higher than the priority of the current grandmaster, by
obtaining a synchronization message including a time of the new communication apparatus from the new communication apparatus before switching the grandmaster to be the new communication apparatus,
calculating a difference between the time of the new communication apparatus and a time of the device, and when the difference is less than a threshold, perform mediation to switch the grandmaster to be the new communication apparatus, and
when the difference is more than or equal to the threshold, either (1) ignore the synchronization message from the new communication apparatus thereby preventing mediation to be performed to switch the grandmaster to be the new communication apparatus, or (2) cause the new communication apparatus to synchronize time with the current grandmaster before performing mediation to switch the grandmaster to be the new communication apparatus.

2. The communication apparatus according to claim 1, wherein the processing circuitry
when the difference is more than or equal to the threshold, synchronizes time with the current grandmaster without switching the grandmaster to be the new communication apparatus.

3. The communication apparatus according to claim 1, wherein the processing circuitry
when the difference is more than or equal to the threshold, sets an assigned priority of the device higher than the priority of the new communication apparatus, thereby causing the device to be selected as the grandmaster.

4. The communication apparatus according to claim 3, wherein the processing circuitry
after synchronizing the plurality of communication apparatuses based on the device being the grandmaster, makes the priority of the device return to an original value, and transmits another grandmaster mediation message indicating the including the priority of the device as the original value, thereby causing the new communication apparatus to be selected as the grandmaster.

5. A communication system comprising a plurality of communication apparatuses that selects, from the plurality of communication apparatuses, a grandmaster that is to be a standard of time of the plurality of communication apparatuses, wherein
a device configured as one of the plurality of communication apparatuses includes processing circuitry
to obtain from a new communication apparatus not part of plurality of communication apparatuses, a grandmaster mediation message that is a grandmaster mediation message used for selecting the grandmaster and that includes an assigned priority of the new communication apparatus, and to verify whether or not the priority of the new communication apparatus is higher than an assigned priority of a current grandmaster, and
when the priority of the new communication apparatus is verified as being higher than the priority of the current grandmaster, by
obtaining a synchronization message including a time of the new communication apparatus from the new communication apparatus before switching the grandmaster to be the new communication apparatus,
calculating a difference between the time of the other communication apparatus and a time of the device, and when the difference is less than a threshold, perform mediation to switch the grandmaster to be the new communication apparatus, and
when the difference is more than or equal to the threshold, either (1) ignore the synchronization message from the new communication apparatus thereby preventing mediation to be performed to switch the grandmaster to be the new communication apparatus, or (2) cause the new communication apparatus to synchronize time with the current grandmaster before performing mediation to switch the grandmaster to be the new communication apparatus.

6. A communication method of a device configured as one of a plurality of communication apparatuses that are included in a communication system that selects, from the plurality of communication apparatuses, a grandmaster that is to be a standard of time of the plurality of communication apparatuses, the communication method comprising:
obtaining from a new communication apparatus not part of the plurality of communication apparatuses, a grandmaster mediation message that is a grandmaster mediation message used for selecting the grandmaster and that includes an assigned priority of the new communication apparatus, and verifying whether or not the priority of the new communication apparatus is higher than an assigned priority of a current grandmaster; and when the priority of the new communication apparatus is
verified as being higher than the priority of the current
grandmaster, by
obtaining a synchronization message including a time
of the new communication apparatus from the new
communication apparatus before switching the
grandmaster to be the other communication apparatus,
calculating a difference between the time of the new
communication apparatus and a time of the device,
and when the difference is less than a threshold,
performing mediation to switch the grandmaster to
be the new communication apparatus, and
when the difference is more than or equal to the
threshold, either (1) ignoring the synchronization
message from the new communication apparatus
thereby preventing mediation to be performed to
switch the grandmaster to be the new communication
apparatus, or (2) causing the new communication
apparatus to synchronize time with the current
grandmaster before performing mediation to switch
the grandmaster to be the new communication apparatus.

7. A non-transitory computer readable medium storing a communication program of a device configured as one of a plurality of communication apparatuses that are included in a communication system that selects, from the plurality of communication apparatuses, a grandmaster that is to be a standard of time of the plurality of communication apparatuses, the communication program causing the device that is a computer to execute:

a priority verification process to obtain from a new
communication apparatus not part of the plurality of
communication apparatuses, a grandmaster mediation
message that is a grandmaster mediation message used
for selecting the grandmaster and that includes an
assigned priority of the new communication apparatus,
and to verify whether or not the priority of the new
communication apparatus is higher than an assigned
priority of a current grandmaster; and
a mediation process, when the priority of the new communication apparatus is verified as being higher than
the priority of the current grandmaster,
to obtain a synchronization message including a time of
the new communication apparatus from the new
communication apparatus before switching the
grandmaster to be the new communication apparatus,
to calculate a difference between the time of the new
communication apparatus and a time of the device,
when the difference is less than a threshold, perform
mediation to switch the grandmaster to be the new
communication apparatus, and
when the difference is more than or equal to the
threshold, either (1) ignore the synchronization message from the new communication apparatus thereby
preventing mediation to be performed to switch the
grandmaster to be the new communication apparatus, or (2) cause the new communication apparatus to
synchronize time with the current grandmaster
before performing mediation to switch the grandmaster to be the new communication apparatus.

* * * * *